United States Patent [19]

Brand et al.

[11] 3,915,962

[45] Oct. 28, 1975

[54] PROCEDURE FOR THE PREPARATION OF AROMATIC 2-IMINO-1,3-DITHIETANES

[75] Inventors: William Wayne Brand, Hopewell; Thomas Walter Drabb, Jr., Trenton, both of N.J.

[73] Assignee: American Cyanamid Company, Stamford, Conn.

[22] Filed: Feb. 11, 1974

[21] Appl. No.: 441,193

Related U.S. Application Data

[63] Continuation-in-part of Ser. No. 336,642, Feb. 28, 1973, abandoned.

[52] U.S. Cl....... 260/239.6; 260/327 M; 260/397.6; 260/513.5; 424/277
[51] Int. Cl.².......................................... C07D 339/00
[58] Field of Search..................... 260/327 M, 239.6

[56] References Cited
UNITED STATES PATENTS
3,470,207    9/1969    Addor................................. 260/327
3,484,455    12/1969    Addor................................. 260/327

Primary Examiner—Sherman D. Winters
Attorney, Agent, or Firm—Harry H. Kline

[57]    ABSTRACT

There is provided a process for the manufacture of aromatic 2-imino-1,3-dithietanes which involves the reaction of a dithiocarbamate salt with a methylene halide in the presence of a base and a suitable inert solvent, followed by treatment of the reaction mixture with a sulfide selected from the group consisting of ammonium sulfide, sodium sulfide, potassium sulfide, sodium hydrosulfide and potassium hydrosulfide so as to obtain corresponding dithietanes of increased yields and purity.

7 Claims, No Drawings

PROCEDURE FOR THE PREPARATION OF AROMATIC 2-IMINO-1,3-DITHIETANES

This application is a continuation-in-part of our copending application, Ser. No. 336,642, filed Feb. 28, 1973, now abandoned.

The present invention relates to a novel process for the preparation of aromatic 2-imino-1,3-dithietanes having the formula:

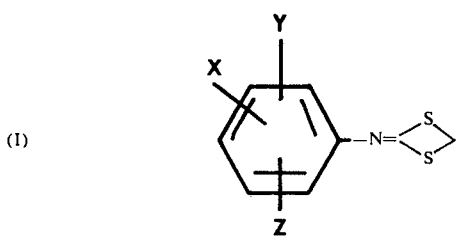

(I)

wherein X, Y and Z each represents a radical such as hydrogen, halogen such as fluoro, chloro, bromo or iodo, $R(M)_n$, hydroxy, phenyl, phenoxy, monohalophenoxy, nitro, trihalomethyl, cyano, isothiocyano, carb(lower)alkoxy, $R_1S(O)_m$, monoloweralkylamino, diloweralkylamino, and 1,3-dithietanylideneamino and wherein R is alkyl of from one to eight carbon atoms, cycloalkyl of from five to seven carbon atoms, alkenyl or alkynyl of from three to eight carbon atoms, M is O or S, $R_1$ is loweralkyl, $n$ is an integer from 0 to 1, $m$ is an integer from 1 to 2, and when two of X, Y or Z are taken together on adjacent carbon atoms they may form a benzo group.

It is known that the reaction of an aryldithiocarbamate salt with a methylene halide results in the formation of the corresponding 2-arylimino-1,3-dithietane. However, the yields are generally low. This is not only detrimental in itself, but also complicates product isolation and purification.

It is, therefore, an object of this invention to provide an improved method for carrying out the synthesis to give increased yields of 2-arylimino-1,3-dithietanes. It is a further object to provide a method of isolation of said 1,3-dithietanes which provides high purity product without the usual requirement of distillation, recrystallization, chromatography or the like. Other objects and advantages will become apparent from a reading of the ensuing description.

In accordance with the process of this invention, compounds having the above structure (I) can be prepared by reacting equimolar amounts of an appropriate aniline, carbon disulfide and base, to yield the desired dithiocarbamate salt. The dithiocarbamate salt is then reacted with from 1.5 to 3 equivalents of methylene halide in the presence of 1 equivalent of base and a suitable inert solvent. The thus-formed reaction mixture thereof is treated with 0.2 – 0.5 equivalents of aqueous ammonium sulfide solution, sodium sulfate, potassium sulfide, sodium hydrosulfide or potassium hydrosulfide, to provide the desired aromatic 2-imino-1,3-dithietane in enhanced yield and high purity.

Preferred solvents are polar solvents such as water, sulfolane, lower alcohol($C_1$–$C_6$), aqueous lower alcohol, ethylene glycol dimethyl ether, diethylene glycol dimethyl ether, dimethyl sulfoxide (DMSO), dimethylformamide (DMF), and pyridine. These reactions may be graphically illustrated as follows:

(1)

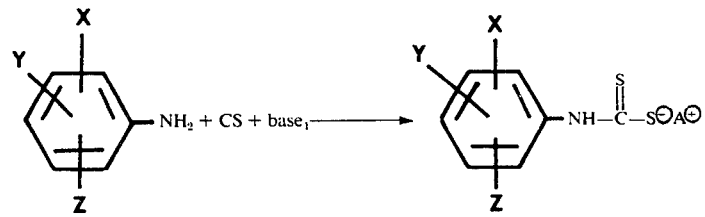

where $base_1$ is (a) ammonia, (b) a tertiary amine or (c) an alkali metal hydroxide in which event $A^+$ is an ammonium ion, a trialkylammonium ion, or an alkali metal cation, respectively. This reaction is preferably carried out at a temperature between about 0°C. and 30°C. The resultant product is next reacted as follows:

(2)

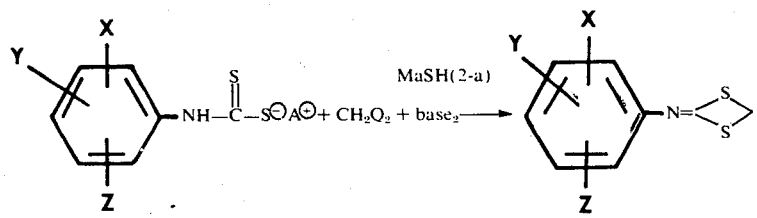

where $base_2$ may be an alkali metal hydroxide, carbonate, or bicarbonate or a tertiary amine, such as trimethylamine or triethylamine, Q is bromine or iodine, $a=1$ or 2, M is an alkali metal or ammonium, and $A^+$ and X, Y, and Z are as defined above. This reaction is preferably carried out at a temperature between about 0°C. and 50°C. in a solvent, such as pyridine, dimethysulfoxide or dimethylformamide.

In an alternative procedure, the intermediate:

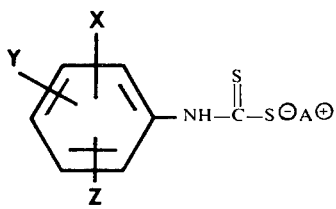

where X, Y, Z, and $A^+$ are as defined above, can be prepared from an appropriate aryl isothiocyanate by reaction with an alkali metal hydrosulfide in a suitable solvent.

Resultant 2-arylimino-1,3-dithietanes can be purified by dissolving the crude product mixture in a water miscible solvent, such as acetone or methyl ethyl ketone, and treating the mixture with one equivalent of concentrated hydrochloric acid. The hydrochloride salt is then filtered off and washed with an appropriate solvent such as acetone, methyl ethyl ketone, or ethylene chloride. It is then hydrolyzed by either (a) slurrying with a mixture of water and an organic solvent which is not water soluble, and stirring until all solids have dissolved, followed by separation and evaporation of the organic phase or (b) slurrying the hydrochloride salt in warm water, and titrating with a base such as aqueous ammonia to its endpoint, and mechanically separating the resulting product.

Advantageously, the compounds prepared by the process of this invention have utility as ovicidal and larvicidal agents for insects and acarina. They may also be employed as chemosterilants for Ixodides and have been found to produce juvenile hormone-like effects in certain species of insects. Moreover, they have been found to suppress fecundity in Ixodides and cause dwarfing of insect larvae.

In practice, the compounds prepared in accordance with the process of the present invention will generally be used in combination with conventional solid or liquid adjuvants and formulation aids. They may be formulated as dusts, dust concentrates, wettable powders, emulsifiable concentrates, or the like, and applied to the locus or habitat of the insects and/or acarina sought to be controlled.

Solid formulations, such as dusts or dust concentrates, can be prepared by grinding the active ingredient, if solid, together with an inert solid diluent such as attapulgite, kaolin, walnut shell flour, or diatomaceous earth, or where the active ingredient is liquid, spraying said ingredient on the carrier and thoroughly mixing it with the carrier. The active ingredient may also be dissolved in a solvent, such as acetone, lower alkanol, xylene, toluene, or the like, and then sprayed as a dilute solution on the solid carrier. Dusts usually contain from about 1% to 15% by weight of active ingredient, whereas concentrates may contain from about 16% to about 85% by weight of the active material.

Wettable powders are prepared in the same fashion as dust concentrates, excepting that about 5% to 10% by weight of a surfactant is also added. The wettable powder is then generally dispersed in water or other suitable diluent for application as a dilute liquid spray to the plant, animal or locus where insect or acarina control is desired. Such liquid formulations may also be used as a dip for animals.

The compounds prepared by the process of this invention may also be prepared as emulsifiable concentrates by dissolving or dispersing about 10% to 75% by weight of the active compound in a suitable solvent or carrier such as a petroleum distillate having a minimum aromatic content of 85% and admixing therewith about 10% by weight of an emulsifier, such as polyoxyethylene derivatives and blends with alkyl aryl sulfonates. These concentrates are also generally dispersed in water or other suitable solvent for application as liquid sprays or animal dips.

As ovicidal agents, it has been found that generally about 0.4 ppm. to about 2500 ppm. of the aromatic 2-imino-1,3-dithietane is effective for preventing embryogenesis of insect and acarina ova.

It has also been found that control of the larval stages of certain insects requires the application of from about 0.25 pound to 8 pounds per acre of the active ingredient; whereas, control of the larval stages of Ixodides is usually obtained with a dilute formulation containing from about 10 ppm. to 500 ppm. of the dithietane.

The chemosterilant activity of the dithietanes, as applied to Ixodides, is established by the finding that treatment of adult female ticks such as Boophilus, Amblyomma, Anocentor, Dermacentor, Ixodes, Haemaphysalis, Hyalomma, Rhipicentor, Margaropus and Rhipicephalus, with an aromatic 2-imino-1,3-dithietane, as described above, inhibits egg production, or if eggs are laid, prevents embryogenesis.

Suppression of fecundity, dwarfing of larvae and apparent juvenile hormone effect in certain insects is observed when the compounds of the present invention are applied to the habitat and/or diet of insects such as the southern armyworm (*Prodenia eridania*), confused flour beetle (*Tribolium confusum*), house fly (*Musca domestica*), mosquito (*Anopheles quadrimaculatus*), Mexican bean beetle (*Epilachna varivestis*), or southern corn rootworm (*Diabrotica undecimpunctata howardi*). It has also been observed that the pupae of certain insect species which are obtained from larvae reared in a habitat or medium treated with a sublethal concentration of aromatic dithietane, have no adult insect emergence, or in some instances, produce deformed adults which expire shortly after emergence.

The invention may be further understood by referring to the example set forth below which are to be taken as merely illustrative and not by way of limitation.

EXAMPLE 1

Preparation of Triethylammonium 4-Chloro-2 methylphenyl Dithiocarbamate

To a stirred solution of 707.5 grams (5 moles) a 2-methyl-4-chloroaniline and 505 grams (5 moles) of triethylamine in one liter of ethyl acetate is added dropwise 418 grams (5.5 moles) of carbon disulfide during a 30 minute period. A mild exotherm, which began when the addition was about half complete, is easily controlled by intermittant use of an ice bath. After stirring overnight, the thick yellow slurry is filtered and the precipitate washed with 1.5 liters of ether and air dried yielding 1450 grams (91%) of a pale yellow solid, melting point 101°C. to 102°C. (dec.).

EXAMPLE 2

Preparation of 4-Chloro-o-tolyliminodithietane in which the Critical Order of Sulfide Addition is Established to Affect the Yield To a solution of 296 grams (1.71 moles) of methylene bromide and 86.5 grams (0.855 mole) of triethylamine in 850 ml. of dimethylsulfoxide is slowly added 272.5 grams (0.855 mole) of triethylammonium 4-chloro-2-methylphenyl dithiocarbamate with stirring. An ice bath is used to keep the temperature below 30°C. The reaction is then stirred for 15 minutes at room temperature, after which 62 ml. (62.2 grams, 0.128 mole) of 24% aqueous ammonium sulfide is added dropwise over 15 minutes, keeping the temperature below 30°C. The reaction mixture is then stirred for 45 minutes and poured into 5 liters of cool water and the oil drained off. The aqueous layer is extracted with three 100 ml. portions of methylene chloride, and the combined organic solution is washed with 500 ml. of saturated sodium chloride solution, dried, and concentrated under vacuum to give 195 grams of an oily yellow solid which analyze as 78% pure. An aliquot (5.5% of the total) of this crude product is taken up in 75 ml. of acetone, 5 ml. of concentrated HCl is added, and the resulting slurry is stirred and filtered. The salt is washed with acetone and air dried giving a white solid which, corrected to the entire sample, represents a 75% yield. This salt can be quantitatively hydrolyzed to the free imine, by stirring with ether and water until all of the salt has dissolved and drying and evaporating the ether layer, giving a white solid, melting point 44.5°C. to 45.5°C.

Repeating the above reaction except that the ammonium sulfide is omitted, a 58% yield of the hydrochloride salt is obtained. Further, in repeating the above reaction in every detail excepting that the ammonium sulfide solution is added prior to the addition of the dithiocarbamate salt, there is then obtained a 59.9% yield of the hydrochloride salt.

EXAMPLE 3

Preparation of Phenyliminodithietane

The procedure of Example 2 is followed in every detail except that ammonium dithiocarbanilate is substituted for triethylammonium 4-chloro-2-methyl-phenyldithiocarbamate. A 73.2% yield of phenyliminodithietane is obtained.

Repeating the above reaction but omitting the addition of the ammonium sulfide solution, a 62.4% yield of the same product, namely, phenyliminodithietane, is realized.

EXAMPLE 4

Preparation of 4-Hydroxyphenyliminodithietane

The procedure of Example 2 is repeated in every detail except that when the reaction mixture is poured into water, a tan precipitate forms and is filtered off and washed with water. The resultant solid is slurried with 1 N KOH and filtered, and the solids washed with 1 N KOH. The resulting alkaline filtrate is acidified to pH 1 with concentrated hydrochloric acid, and the precipitate which formed is filtered off, washed well with water, and dried at reduced pressure giving an 83.2% yield of the 4-hydroxy-phenylimino dithietane as a tan solid, m.p. 156°–157°C.

Repeating the above reaction but omitting the ammonium sulfide addition, the yield of dithietane realized is 63.5%.

EXAMPLES 5 THROUGH 11

The advantages of the process of the present invention, e.g. enhanced product yield and improved purity, is demonstrated by the following tests. In such tests, the procedure of Example 2 is followed excepting that the appropriate dithiocarbamates are substituted for triethylammonium 4-chloro-2-methylphenyldithiocarbamate. Compounds obtained are reported in Table I below with the corresponding yields and analyses.

Preparation of Aryliminodithietanes by Addition of $(NH_4)_2S$ to the Reaction Mixture After 15 Minutes

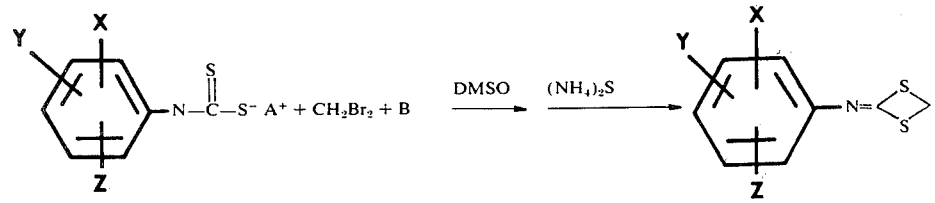

| Example Number | X | Y | Z | Yield | Melting Point °C. | Empirical Formula | Calculated C | Calculated H | Calculated N | Found C | Found H | Found N |
|---|---|---|---|---|---|---|---|---|---|---|---|---|
| 5 | 4—Cl | 2—$C_2H_5$ | H | 62.3% | yellow oil | $NS_2ClC_{10}H_{10}$ | 49.27 | 4.13 | 5.75 | 49.68 | 4.31 | 5.82 |
| 6 | 4—$OCH_3$ | 2—$CH_3$ | H | 57% | liquid | $NS_2OC_{10}H_{11}$ | 53.32 | 4.88 | 6.22 | 53.45 | 4.94 | 6.17 |
| 7 | 2—Br | H | H | 76% | 68–70 | $NS_2BrC_8H_6$ | 36.94 | 2.30 | 5.39 | 36.83 | 2.30 | 5.28 |
| 8 | 2—$CH_3$ | 6—$CH_3$ | H | 43% | 111–113.5 | $NS_2C_{10}H_{11}$ | 57.40 | 5.26 | 6.70 | 56.43 | 5.31 | 6.60 |
| 9 | 2—$OC_2H_5$ | H | H | 56% | 75.5–78 | $NS_2OC_{10}H_{11}$ | 53.20 | 4.90 | 6.21 | 53.03 | 4.94 | 6.15 |
| 10 | 2—F | H | H | 55% | 52.5–53.5 | $NS_2FC_8H_6$ | 48.23 | 3.01 | 7.03 | 47.81 | 3.03 | 6.97 |
| 11 | 2—Cl | 6—$CH_3$ | H | 69% | 106–111.5 | $NS_2ClC_9H_8$ | 47.05 | 3.51 | 6.10 | 47.22 | 3.52 | 6.03 |

$A^+$ = Alkali metal cation, ammonium or trialkylammonium ion.
B = Base

EXAMPLES 12 THROUGH 73

Following the procedure of Example 2, but substituting the appropriate dithiocarbamate for triethylammonium 4-chloro-2-methylphenyldithiocarbamte, the compounds reported in Table II below are obtained.

TABLE II

Aromatic 2-Imino-1,3-dithietanes

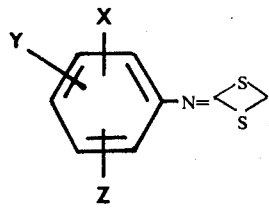

| Example Number | X | Y | Z | Melting Point °C. |
|---|---|---|---|---|
| 12 | 2—Phenyl | H | H | 63.5–66 |
| 13 | 2—C₃H₇—i | 6—C₃H₇—i | H | 72–76 |
| 14 | 2—CF₃ | H | H | liquid |
| 15 | 2—C₂H₅ | H | H | liquid |
| 16 | 2—CH₃ | 3—CH₃ | H | 84.5–86.5 |
| 17 | 3—NCS | H | H | 64–65 |
| 18 | 3—⟨S-S⟩=N— | H | H | 152–154 |
| 19 | 2,3—benzo |  | H | 103–105 |
| 20 | 3—CH₃O— | 4—CH₃O | H | 82.5–83.5 |
| 21 | 3—CH₃ | 4—Br | H | 71–73 |
| 22 | 2—CH₃ | 5—CH₃ | H | 33–34 |
| 23 | 4—Cl | H | H | 86.8–88 |
| 24 | 4—CH₃ | H | H | 54.5–55 |
| 25 | 4—CH₃ | H | H Cl | 168–170 |
| 26 | 4—C₂H₅ | H | H | oil |
| 27 | 4—C₄H₉—n | H | H | oil |
| 28 | 4—⟨C₆H₄⟩—O— | H | H | 67.5–68.5 |
| 29 | 4—CH₃—O—C(O)— | H | H | 79–80 |
| 30 | 4—(CH₃)₂—N— | H | H | 96–98 |
| 31 | 4—N=C=S | H | H | 121–122 |
| 32 | 4—Cl—⟨C₆H₄⟩—O— | H | H | 58.5–59 |
| 33 | 4—⟨S-S⟩=N— | H | H | 220–223 |
| 34 | 3—CH₃ | H | H | 28.5–29.5 |
| 35 | 3—CF₃ | H | H | oil |
| 36 | 3—C₂H₅O— | H | H | oil |
| 37 | 3—NO₂ | H | H | 96–97 |
| 38 | 3—Cl | H | H | 76–77 |
| 39 | 3—Br | H | H | 67.5–69.5 |
| 40 | 3—⟨C₆H₄⟩—O— | H | H | oil |
| 41 | 3—CH₃—S— | H | H | oil |
| 42 | 3—COOC₂H₅ | H | H | 62.5–63.5 |
| 43 | 2—CH₃ | H | H | 34–35 |
| 44 | 2—Cl | 3—Cl | H | 77–79 |
| 45 | 2—CH₃ | 3—Cl | H | 80–81.5 |
| 46 | 2—CH₃ | 4—CH₃ | H | oil |
| 47 | 2—Cl | 4—Cl | H | 95–97 |
| 48 | 2—CH₃ | 4—Br | H | oil |
| 49 | 2—Br | 4—CH₃ | H | 63–65 |
| 50 | 2—Cl | 4—NO₂ | H | 103–104 |
| 51 | 2—CH₃ | 5—C₃H₇—i | H | oil |
| 52 | 2—Cl | 5—Cl | H | 98–99 |
| 53 | 2—C₂H₅ | 6—C₂H₅ | H | 56–57 |
| 54 | 3—CH₃ | 4—CH₃ | H | oil |
| 55 | 3—Cl | 4—CH₃ | H | 80–80.5 |
| 56 | 3—Cl | 4—Cl | H | 100–101.5 |
| 57 | 3—CF₃ | 4—Cl | H | oil |
| 58 | 3—Cl | 5—Cl | H | 106–108 |

TABLE II-continued

Aromatic 2-Imino-1,3-dithietanes

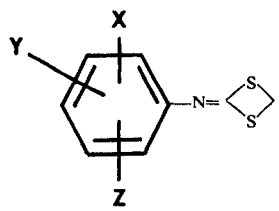

| Example Number | X | Y | Z | Melting Point °C. |
|---|---|---|---|---|
| 59 | 2—Cl | 4—Cl | 5—Cl | 96.5–98.5 |
| 60 | 2—CH$_3$ | 4—CH$_3$ | 5—CH$_3$ | 41–42 |
| 61 | 3—Cl | 4—CH$_3$O— | 6—CH$_3$O— | 104.5–106 |
| 62 | 2—Cl | 4—C$_8$H$_{17}$ | H | — |
| 63 | 4—CH$_3$S— | H | H | 76–77.5 |
| 64 | 4—F | H | H | 59–60 |
| 65 | 4—I | H | H | 139.5–141 |
| 66 | 4—CH$_3$O— | H | H | 37.5–38.5 |
| 67 | 4—CN | H | H | 78.5–79.5 |
| 68 | 4—NO$_2$ | H | H | 135–137 |
| 69 | 3—CN | H | H | 114–115 |
| 70 | 2—Cl | H | H | 42.5–44 |
| 71 | 2—CH$_3$O— | H | H | 112–114 |
| 72 | 2—Cl | 4—CH$_3$ | H | 67.5–70.5 |
| 73 | 2—CH$_3$ | 4—NO$_2$ | H | 128.5–130.5 |

EXAMPLE 74

Following the procedure of Example 2, but substituting sodium phenyldithiocarbamate for triethylammonium 4-chloro-2-methylphenyl dithiocarbamate, dimethylformamide for dimethylsulfoxide, sodium bicarbonate for triethylamine, and sodium sulfide for ammonium sulfide, a good yield of 2-phenylimino-1,3-dithietane is obtained.

EXAMPLE 75

The procedure of Example 2, is repeated in every detail except that potassium 4-chloro-2-methylphenyl dithiocarbamate is substituted for triethylammonium 4-chloro-2-methylphenyl dithiocarbamate, pyridine for dimethylsulfoxide, sodium hydroxide (porous beads) for triethylamine, and potassium hydrosulfide for ammonium sulfide, a good yield of 2-(4-chloro-2-methylphenylimino)-1,3-dithietane is obtained.

EXAMPLE 76

Following the procedure of Example 2, but substituting water and from 2% to 5% of a polyethyleneoxy surfactant, Igepal RC 520, for dimethylsulfoxide, 2-(4-chloro-2-methylphenylimino)-1,3-dithietane is isolated in high purity.

EXAMPLE 77

Budworm Egg and Larva Test

Test solutions are prepared in 50% acetone/50% water, initially at 100 ppm. A one-inch square piece of cheesecloth infested with about 100 eggs of *Heliothis virescens* is dipped for a second in the solution along with a young cotton leaf. These are allowed to dry and are placed in a covered wax paper cup. Egg mortality ratings are made after three days. Larval mortality ratings are made after seven days. Ratings are as follows:

Ratings: + = killed 86% to 100%
± = killed 41% to 85%
0 = killed 0% to 40%
— = not tested Active compounds are further tested at tenfold dilution until activity is lost. The results obtained with test compounds are reported below by reference to the example number for such compound.

Budworm Egg Test + Rated Compounds at 100 ppm.

Compounds of Examples 24, 26, 27, 29, 31, 34, 36, 37, 38, 39, 41, 42, 43, 37, 38, 39, 52, 54, 55, 56, 57, 58, 5, 70, 71, 72, 73, and 75.

Budworm Egg Test ± Rated Compounds at 100 ppm.

Compounds of Examples 28, 30, 46, 50, 76, 77 and 78.

Budworm Larva Test + Rated Compounds at 100 ppm.

Compounds of Examples 37 and 72.

EXAMPLE 78

Ovididal Activity of Southern Armyworm Eggs, Mexican Bean Beetle Eggs and Southern Corn Rootworm Eggs In these tests, various concentrations of the test compound are prepared in a mixture of 65% acetone/35% water. The primary leaves of Sieva lima bean plants on which southern armyworm eggs are laid during the previous 24 hours were then dipped for about 5 seconds in the test solution. After the leaves are dry, they are placed 9.0 cm. petri dishes containing moist filter paper on the bottom. The eggs are incubated at 80°F.

Treatment of Mexican Bean Beetle Eggs and Two-Spotted Spider Mite Eggs

The procedure used in these tests is the same as disclosed above for southern armyworm eggs.

Treatment of Southern Corn Rootworm Eggs

Eggs are deposited on a 3 inch × 3 inch square of moist cotton that is placed in a cage with adults for two days. The eggs are removed from the cotton with deionized water and approximately 15 eggs are transferred to a 9.0 cm. filter paper by a medicine dropper. This filter paper is placed on top of two filter papers in a 9.0 cm. petri dish. All the papers are moist with dionized water. One ml. of the test solution is pipetted onto the eggs and filter paper. The solvent is allowed to evaporate before the lid is placed on the dish. The eggs are incubated at 80°F.

The data obtained in these tests are reported in Table IV for test compounds as H = Hatch, P = Partial Hatch, and N = No Hatch.

TABLE IV

| | Ovicidal Activity of Test Compounds Concentration in ppm. | | | | | | | | | | |
|---|---|---|---|---|---|---|---|---|---|---|---|
| Compound Example Number | Southern Armyworm | | | Mexican Bean Beetle | | | Southern Corn Rootworm | | | Two-Spotted Spider Mites | | |
| | 300 | 100 | 30 | 300 | 100 | 30 | 300 | 100 | 30 | 300 | 100 | 30 |
| 5 | N | N | H | N | P | H | N | N | N | P | H | H |
| 24 | N | N | H | N | N | H | N | N | N | N | N | H |
| 26 | P | H | — | N | N | H | — | — | — | P | H | — |
| 27 | H | H | — | N | P | H | — | — | — | P | H | H |
| 34 | N | N | H | N | N | H | N | N | N | N | H | H |
| 69 | N | N | P | N | N | N | N | N | N | H | H | — |
| 37 | N | N | H | N | H | H | N | N | P | P | H | H |
| 70 | N | P | H | N | N | H | N | N | N | H | H | — |
| 36 | H | H | — | H | H | — | N | N | H | H | H | — |
| 29 | N | H | H | N | P | H | — | — | — | H | H | — |
| 28 | — | H | H | — | H | H | N | N | H | H | H | — |
| 56 | H | N | H | N | N | H | N | N | H | N | N | H |
| 54 | N | H | H | N | N | H | N | N | N | P | N | H |
| 58 | N | N | N | N | H | H | P | P | H | H | H | — |
| 44 | H | H | — | N | N | H | N | N | P | H | H | — |
| 55 | P | H | H | H | H | — | N | P | H | H | H | — |
| 76 | N | N | P | H | H | — | — | — | — | H | H | — |

EXAMPLE 79

Effective control of acarine larvae is demonstrated in the following tests with larvae of *Boophilus microplus*, a one-host tick which can remain on a single host through its three life stages, i.e., larva, nymph and adult. In these tests, a 10% acetone/90% water mixture contains from 1.0 to 100 ppm. of test compound. Twenty larvae are enclosed in a pipette sealed at one end with a gauze material and solution containing the test compound is then drawn through the pipette with a vacuum hose simulating a spray system. The ticks are then held for 48 hours at room temperature and mortality is determined. The results achieved are set forth below. The rating system used is as follows:

| Mortality | Rating System Concentration | | Rating |
|---|---|---|---|
| > 50% | at | 100 ppm. | = + |
| > 50% | at | 33 ppm. | = ++ |
| > 50% | at | 10 ppm. | = +++ |

*Boophilus microplus* Larvae Test, + Rated Compounds

Compounds of Examples 25, 27, 29, 30, 32, 34, 35, 37, 42, 43, 56, 58, 59 and 61.

*Boophilus microplus* Larvae Test ++ Rated Compounds

Compounds of Examples 23, 26, 28, 36, 38, 39, 41, 44, 46, 47, 48, 54 and 57.

*Boophilus microplus* Larvae Test, +++ Rated Compounds

Compounds of Examples 31, 40, 45, 4, 49, 50, 51, 52, 53, 55, 60 and 76.

As the +++ rated compounds are effective as larvicides for Ixodides at 10 ppm., such compounds are the preferred compounds for this utility. The ++ rated compounds are also highly effective as larvicidal agents for the Ixodides, giving greater than 50% kill when applied at a concentration of 33 ppm. in solution.

We claim:
1. A process for the manufacture of a compound having the formula:

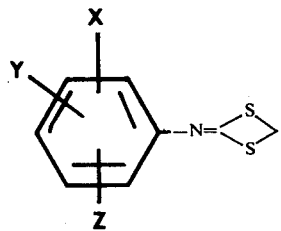

wherein X, Y and Z each represent a member selected from the group consisting of hydrogen, halogen, R(M)n, hydroxy, phenyl, phenoxy, monohalophenoxy, nitro-trihalomethyl, cyano, isothiocyano, carb(lower)-alkoxy, $R_1 S(O)_m$, diloweralkylamino, monoloweralkylamino and 1,3-dithietanylideneamino; R is an alkyl from one to eight carbon atoms, cycloalkyl from five to seven carbon atoms, alkenyl from three to eight carbon atoms, alkynyl from three to eight carbon atoms; $R_1$ is alkyl from one to four carbon atoms; M is O or S; $n$ is an integer selected from 0 and 1, $m$ is an integer selected from 1 and 2, and when two of X, Y or Z are taken together on adjacent carbons, they form a benzo group, which comprises the steps of: reacting a compound having the structure:

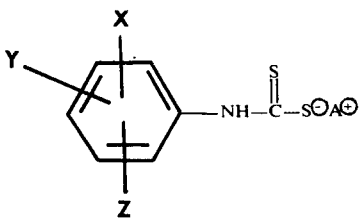

where X, Y and Z are as defined above and $A^+$ represents a cation, with a methylene halide in the presence of base selected from the group consisting of alkali metal hydroxide, alkali metal carbonate and tertiery $C_1$–$C_4$ aliphatic amine and an inert solvent, selected from the group consisting of water, sulfolane, lower alcohol $C_1$–$C_4$, aqueous lower alcohol, ethylene glycol dimethylether, diethylene glycol dimethylether, pyridine, dimethylsulfoxide and dimethylformamide treating the thus formed reaction mixture with a sulfide selected from the group consisting of ammonium sulfide, sodium sulfide, potassium sulfide, sodium hydrosulfide, and recovering the desired product.

2. A method according to claim 1 wherein the product from said process is dissolved in a solvent selected from acetone and methyl ethyl ketone and the thus-formed mixture treated with at least one equivalent of hydrochloric acid, whereby the acid salt is precipitated and, thereafter, neutralizing the resulting salt with either water or aqueous ammonia.

3. A method according to claim 1, wherein $A^+$ represents a cation selected from the group consisting of ammonium, trialkylammonium and alkali metal.

4. A method according to claim 3, wherein the reaction is carried out at a temperature between 0°C. and 50°C.

5. A method according to claim 1, wherein the methylene halide is selected from methylene bromide and methylene iodine.

6. A method according to claim 1, wherein the reaction is carried out at a temperature between 0°C. and 50°C. and the solvent is dimethylformamide.

7. A method according to claim 6, wherein the reaction product is dissolved in acetone or methyl ethyl ketone and the resulting mixture treated with hydrochloric acid, whereby the hydrochloride salt is formed, separating said salt from said reaction mixture and, thereafter, either (a) slurrying said salt with water and an organic solvent which is not water soluble, until the solids have dissolved, followed by separation and evaporation of the organic phase or (b) slurrying said salt in water, titrating the resulting mixture with an aqueous base and separating the resulting product from said mixture.

\* \* \* \* \*